US008825765B2

United States Patent
Fyock et al.

(10) Patent No.: US 8,825,765 B2
(45) Date of Patent: Sep. 2, 2014

(54) CROSS PLATFORM GAMING

(75) Inventors: Christina Fyock, Sudbury, MA (US); Mansey K. Amin, Revere, MA (US); Brent Simon, New York, NY (US); Harpal S. Bassali, Waltham, MA (US); Marcelo D. Lechner, Burlington, MA (US); Robert Beckwith, Jersey City, NJ (US); Rick Utley, Rowlett, TX (US); Stella Alvo, New York, NY (US); Kristopher T. Frazier, Arlington, TX (US)

(73) Assignees: Verizon Patent and Licensing Inc., Basking Ridge, NJ (US); Verizon Services Organization Inc., Irving, TX (US); Verizon Services Corp., Ashburn, VA (US)

(*) Notice: Subject to any disclaimer, the term of this patent is extended or adjusted under 35 U.S.C. 154(b) by 1754 days.

(21) Appl. No.: 11/740,136

(22) Filed: Apr. 25, 2007

(65) Prior Publication Data
US 2008/0268947 A1 Oct. 30, 2008

Related U.S. Application Data (60) Provisional application No. 60/867,494, filed on Nov. 28, 2006.

(51) Int. Cl.
*G06F 15/16* (2006.01)
*G06F 17/00* (2006.01)
*H04L 29/06* (2006.01)
*A63F 13/12* (2006.01)
*G07F 17/32* (2006.01)

(52) U.S. Cl.
CPC ............... *H04L 67/38* (2013.01); *A63F 13/12* (2013.01); *A63F 2300/552* (2013.01); *G07F 17/32* (2013.01)
USPC ............. 709/205; 709/227; 709/217; 463/29

(58) Field of Classification Search
CPC ... H04L 67/38; A63F 13/12; A63F 2300/552; G07F 17/32
USPC ............. 463/42, 24, 20, 29; 707/10; 709/226, 709/204, 238, 205, 217, 227
See application file for complete search history.

(56) References Cited

U.S. PATENT DOCUMENTS

| 7,277,946 | B2 * | 10/2007 | Humphrey et al. ........... 709/226 |
| 2001/0044339 | A1 * | 11/2001 | Cordero et al. ................. 463/42 |
| 2006/0064421 | A1 * | 3/2006 | Futagawa ........................ 707/10 |
| 2007/0099694 | A1 * | 5/2007 | McCarthy et al. .............. 463/24 |
| 2007/0191100 | A1 * | 8/2007 | Counts ............................ 463/42 |
| 2007/0265092 | A1 * | 11/2007 | Betteridge ...................... 463/42 |
| 2007/0265094 | A1 * | 11/2007 | Tone et al. ...................... 463/42 |
| 2008/0227549 | A1 * | 9/2008 | Itskov et al. .................... 463/42 |
| 2008/0268959 | A1 * | 10/2008 | Bryson et al. ................... 463/42 |
| 2008/0274785 | A1 * | 11/2008 | Byng et al. ...................... 463/20 |

* cited by examiner

Primary Examiner — Jungwon Chang (57) ABSTRACT

A first game server is configured to provide a game to a first category of user device. A second game server is configured to provide the game to a second category of user device. A game manager is configured to receive a request from a user device for the game application and to assign the request to one of the first game server and the second game server according to whether the user device is included in the first category of user device or the second category of user device.

23 Claims, 7 Drawing Sheets

CROSS PLATFORM GAMING

BACKGROUND

Electronic games may be provided in a variety of ways. An electronic game generally requires some form of software, firmware, or the like, running on a computing device, and may be provided solely through such software, e.g., on a dedicated game device, personal computer, etc., or through an online game service provided to a computer, set top box (STB) connected to a television, handheld computer, cellular telephone, etc. For example, online game services may provide access to games via real-time or near-real time communications with a remote server. Further, a user may be able to download client gaming software to a computing device through the online game service. Users of a game service having similar devices on which the gaming software has been installed may be able to play a game together.

It is possible to subscribe to more than one game service. For example, a user may access various game services through a number of devices, such as a mobile phone, a computer, and content processing device such as a STB that provides content to a television, video monitor, etc. To access a game service, a user generally must provide authentication information such as a login identifier and password. When a user utilizes more than one game service, the user generally needs to provide separate authentication information for each service. A particular game may be offered for multiple client devices, although a user generally must purchase the game separately for each device. Further, a user who wishes to play a game on more than one user device cannot store a state a game session on a first device, and subsequently load the state to a game session on another device. That is, online gaming systems generally require that a user be uniquely identified with a single device, or at least a single type of device, and do not allow a particular user to play a game at different times from multiple devices, or at least from multiple types of devices (e.g., personal computer, cellular telephone, handheld computer, etc.). Thus, if a user saves a game on one device, the user cannot continue the game on a different device.

Additionally, a user of one type of device is generally unable to participate in a multi-player game with a user of a different device. Different devices may provide different graphics capabilities, different amounts of memory, different processing capabilities, different speeds of connections to an online service, etc.

DETAILED DESCRIPTION OF PREFERRED EMBODIMENTS

Figure 1A:
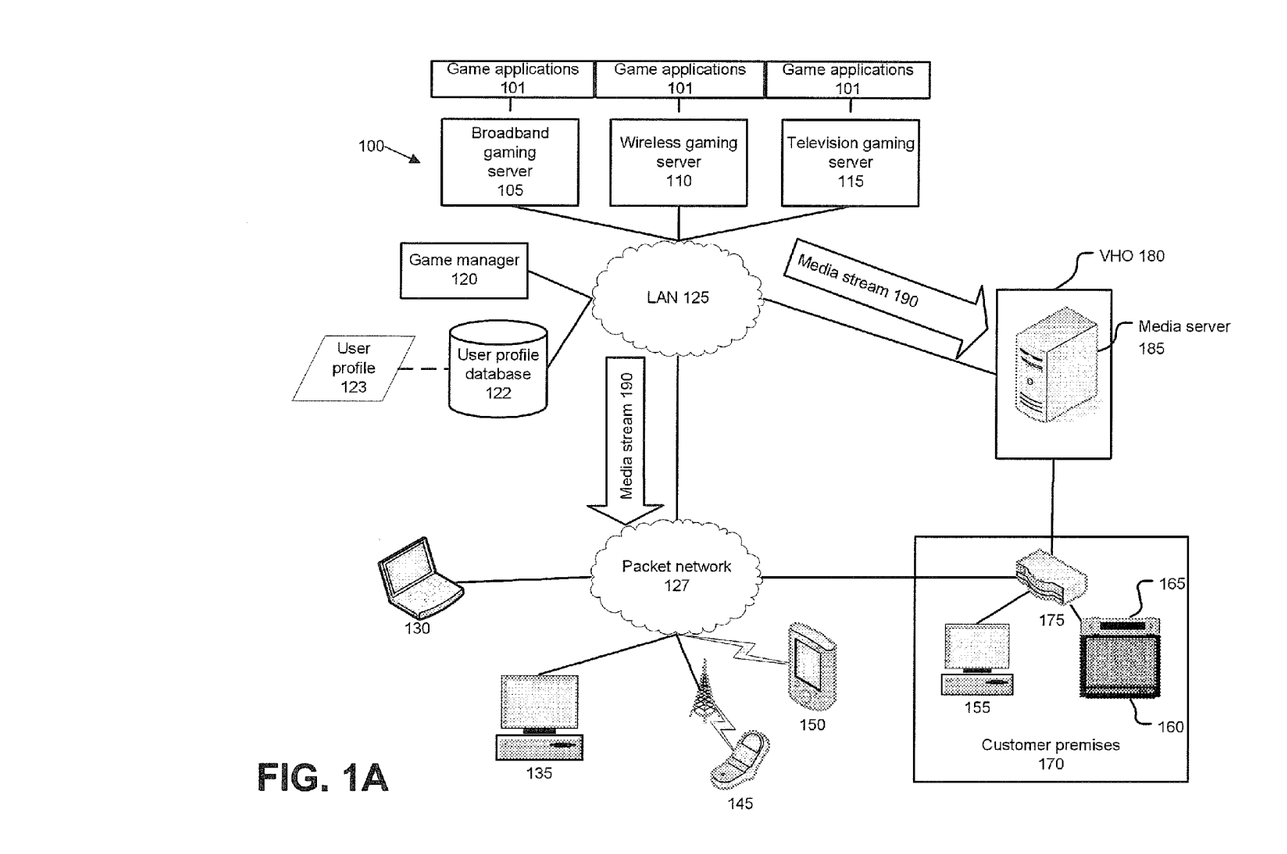
FIG. 1A illustrates an exemplary system for cross platform gaming.

FIG. 1a illustrates an exemplary cross platform gaming system 100. System 100 includes one or more game applications 101 provided by various game servers, including a broadband game server 105, a wireless game server 110, and a television game server 115. Servers 105, 110, 115 may be connected to a local area network (LAN) 125, generally a packet-switched network. Further LAN 125, instead of a LAN, may be a wide area network (WAN), or other network as may be known. Further, servers 105, 110, 115 may also be connected to a game manager 120, e.g., through network 125. Accordingly, servers 105, 110, 115 and game manager 120 may all communicate in a network 125. Network 125 may also be connected to a WAN 127, also generally a packet switched network. For example, WAN 127 may, but need not, include the Internet. It is to be understood that certain of the servers described herein, such as broadband game server 105, wireless game server 110, and television game server 115, while described as a single server for convenience, may in fact include a plurality of servers. As is known, servers may be duplicated and/or clustered for redundancy, load-balancing, etc. Further, certain of the servers 105, 110, 115 may be dedicated to specific applications, such as specific game applications 101.

Game manager 120 may further be in selective communication with a user profile database 122, e.g., through network 125, which database 122 may include a user profile 123. User profile 123 may include information such as a user identifier associated with information concerning games purchased by a user, games saved by a user, and other information. In addition, user profile 123 may include information regarding specific user devices 130, 135, 145, 150, 155, etc., associated with a user, and through which a user may access game applications 101.

Network 125 may further be in selective communication with a media server 185 within a video hub office (VHO) 180. Media server 185 at VHO 180 may also be in selective communication, e.g., through packet network 127, with one or more proprietary routers, or through some other connection, with a customer premises 170. For example, customer premises 170 may include a router 175 in selective communication with media server 185 either directly or through packet switched network 127. Customer premises 170 may further include a computer 155 and/or a content processing device such as set top box (STB) 165 operatively connected with a media display 160, such as a television or a monitor.

Game applications 101 may include single user games, collaborative multi-user games and multi-user head-to-head games, in which two or more users compete against each other.

Game applications 101 may provide a media stream 190, e.g., an MPEG stream or the like, to user devices 130, 135, 145, 150, 155, 165, etc. Further, game applications 101 may receive user inputs, e.g., via devices 130, 135, 145, 150, 155, 165, to play a game and to otherwise interact with game application 101. For example, broadband game server 105 may provide services, such as gaming services, directed to user devices, such as computers 130 or 155, connected to a broadband network. Broadband game server 105 may include one or more modules (not shown) such as a gaming module, a messaging module, etc. For example, a gaming module is generally configured to provide game sessions to a user of a computer 130, 155, etc. In another example, a messaging module is generally configured to allow various users to locate, track, or communicate with other users, e.g., during a game session. Server 105 is generally configured to communicate with a device such as non-mobile computers 130, 135, 155, etc.

Wireless game server 110 may provide services, such as gaming services, to users of wireless computing devices, such as cellular phones 145 or personal digital assistants (PDAs) 150, e.g., through packet network 127. Communication between a wireless game server 110 and a wireless device such as cellular telephone 145 may be sent over a code division multiple access (CDMA) signal, a time division multiple access (TDMA) signal, a Global System for Mobile communication (GSM) signal, a third generation (3G) mobile signal, or other signal adapted to provide content to a mobile device, in addition to wireless protocols such as IEEE 802.11 and Bluetooth, mentioned above.

Similarly, television game server 115 may be configured to provide services, such as gaming services, to users of television based devices. For example, STB 165 may be connected to a display device 160 such as a television or video monitor. Television gaming platform 125 may include one or more modules (not shown) such as an "on-demand" gaming module configured to allow a user to request a game session when desired. Communication between television game server 115 and user device 165 may be made through a network 125, a packet network 127, a VHO 180, or some combination of these or other networks.

Game manager 120 is generally a combination of software and hardware, including one or more dedicated server computers. However game manager 120 may be included within one or more of servers 105, 110, 115. Game manager 120 may be configured to authenticate users seeking to access a server 105, 110, 115 to determine whether such users are registered users of system 100. Game manager 120 may further be configured to receive a request from a user device 130, 135, 145, 150, 155, 165 for a game application 101, and to assign the request to one of servers 105, 110, 115. For example, game manager 120 may assign a request from a mobile phone 145 to a wireless game server 110, or may assign a request from a computer 130 to a broadband game server 105.

User profile database 122 may be located on a stand-alone server (not shown), on one or more of servers 105, 110, 115, or within game manager 120. User profile database 122 may be configured to store one or more user profiles 123. The one or more user profiles 123 may be accessible by game manager 120, and may provide authentication data for user devices 130, 135, 145, 150, 155, 165 accessible through one or more of servers 105, 110, 115, to determine whether a given user device 130, 135, 145, 150, 155, 165 is accessing a valid user profile 123. User profile database 122 generally includes a relational database management system (RDBMS) for storing and managing user data, although other kinds of databases, such as a hierarchical database, a file system, etc. may also be used. User profiles 123 are described in further detail below with reference to FIG. 2.

LAN 125 and packet network 127 are generally internet protocol (IP) networks. As such, networks 125 and 127 generally use one or more known protocols for transporting data, such as user datagram protocol (UDP), transport control protocol (TCP), hypertext transfer protocol (HTTP), etc. Further, networks 125 and 127 may include a variety of networks such as a WAN, e.g., the Internet, a LAN, etc. As is known, networks 125 and 127 may be used to transport a variety of data, including multimedia data such as audio data and video data.

Network 127 may include hardware and software for providing a media stream 190 via coaxial cable and/or fiber optic cable. In one embodiment, fiber optic cable may be used to provide both data and media signals to customer premises 170, including to computer 155 or STB 165. As is known, an optical line terminal (OLT) may serve as a terminus for an optical network or an optical line. An OLT may accordingly provide data, including a media stream 190, to one or more optical network terminals (ONTs). An ONT is generally situated adjacent to a customer premises 170, for the purpose of providing data received over an optical line to one or more devices located in customer premises 170, such as a computer 155 or STB 165. Accordingly, system 100 may include a hybrid network system in which a media signal transported over network 125, and also data transported over packet switched network 127, are received in customer premises 170 through a fiber optic line. However, it should be understood that embodiments are possible in which computer 155 or STB 165 receives both data and audio/video communications via media other than fiber optic cables to customer premises 170.

Packet network 127 may be, and generally is, accessible by one or more computing devices not within a customer premises 170. For instance, computers 130 and 135 may access packet network 127 and may thereby communicate with game manager 120, or with a server, e.g., broadband game server 105. A mobile device such as a mobile phone 145 or a PDA 150 may also connect to packet network 127, e.g., using known wired or wireless connections according to protocols such as IEEE 802.11, Bluetooth, cellular technologies, etc., and may thereby communicate with a server, e.g., wireless game server 110, or game manager 120. Similarly, devices at a customer premises 170, such as a computer 155 or a set top box (STB) 165, which may be connected to a video display device 160, such as a television or monitor, may connect with a server, e.g., broadband game server 105 or television game server 115, through packet switched network 127, such connection being validated through game manager 120. Additionally, as stated above, devices such as computer 155 or STB 165 at a customer premises 170 may communicate with a server, such as server 185, located within VHO 180, which communicates with packet network 127.

VHO 180, which includes media content server 185 as mentioned above, is known for serving as a point of aggregation for media content. For example, a media stream 190, e.g., a video signal encoded as a Motion Picture Experts Group-2 MPEG 2) stream, or according to some other standard for streaming media, may be provided from a server 105, 110, 115 through a network 125 to video hub office 180.

Computing devices, such as those mentioned above, may employ any of a number of known computer operating systems. For example, such devices may use any known versions and/or varieties of the Microsoft Windows operating system; the Unix operating system (e.g., the Solaris operating system distributed by Sun Microsystems of Menlo Park, Calif.); the AIX UNIX operating system distributed by International Business Machines of Armonk, N.Y.; and the Linux operating system. Computing devices may include any one of a number of computing devices that are known, including, without limitation, a computer workstation, a desktop, notebook, laptop, handheld computer, or some other computing device.

Computing devices generally include instructions executable by one or more computing devices such as those listed above. Computer-executable instructions may be compiled or interpreted from computer programs created using a variety of programming languages and/or technologies known to those skilled in the art, including, without limitation, and either alone or in combination, Java, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium includes any medium that participates in providing data (e.g., instructions), which may be read by a computer. Such a medium may take many forms, including, but not limited to, non-volatile media, volatile media, and transmission media. Non-volatile media include, for example, optical or magnetic disks and other persistent memory. Volatile media include dynamic random access memory (DRAM), which typically constitutes a main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example: a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave, or any other medium from which a computer can read.

Figure 1B:
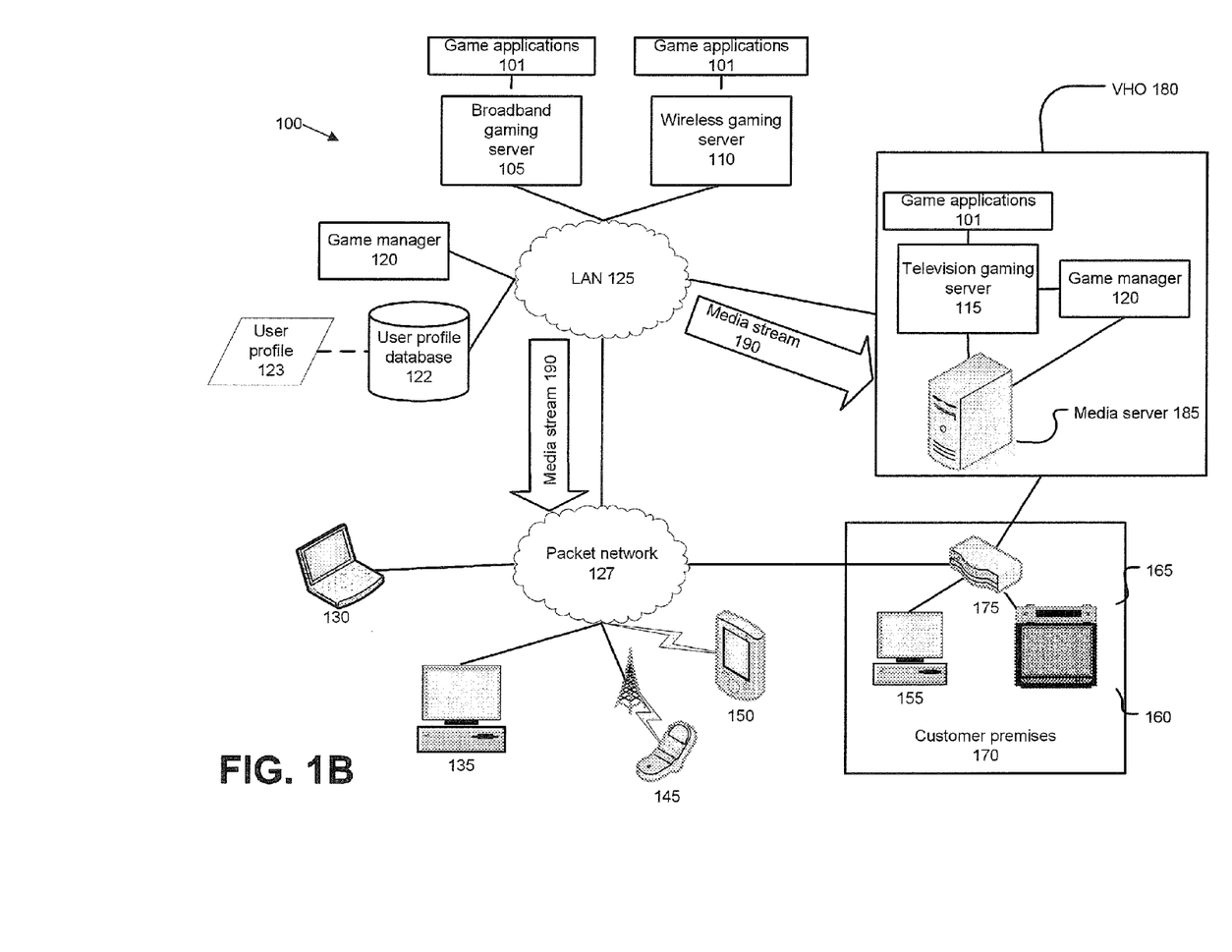
FIG. 1B illustrates another exemplary system for cross platform gaming

FIG. 1B illustrates another exemplary cross platform gaming system 100, similar to that illustrated in FIG. 1A. As illustrated in FIG. 1B, VHO 180 may include television gaming server 115, game application 101, and game manager 120, in addition to (or possibly included on) media server 185.

Television gaming server 115, game manager 120 and media server 185 may communicate within the VHO 180 through a router or some network.

Television gaming server 115 or media server 185 in VHO 180 may communicate with one or more servers, such as servers 105, 110, etc., through LAN 125. Further, television gaming server 115 and/or media server 185 in VHO 180 may communicate with router 175 at customer premises 170.

Figure 2:
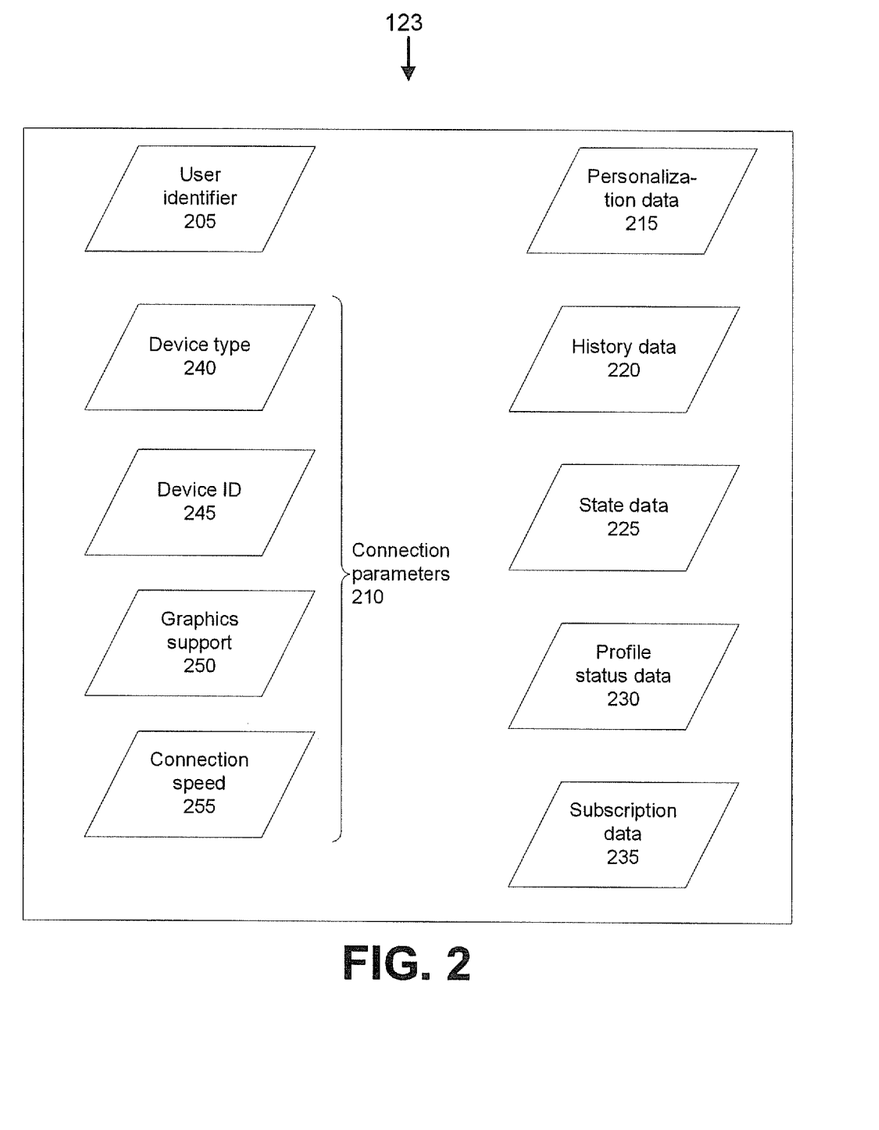
FIG. 2 illustrates an exemplary user profile.

FIG. 2 illustrates an exemplary user profile 123. User profile 123 may include a unique or substantially unique user identifier 205 associated with each user profile 123 stored in user profile database 122, along with connection parameters 210, personalization data 215, history data 220, state data 225, profile status data 230, subscription information stored in subscription data 235, etc.

A user identifier 205 may be used by game manager 120 to retrieve a user profile 123. User identifier 205 may be, e.g., a user name and password, a device identifier, such as device ID 245, explained below, etc.

Personalization data 215 may include such information as a user name to be used during a game session and displayed to other users, "buddy lists" of user names of other users, and an avatar, which is a graphical representation of a user. An avatar may be stored in a user profile in one or more known graphical formats, e.g., Graphical Interchange Format (GIF), Joint Photographic Experts Group format (JPEG), Portable Network Graphics format (PNG), etc.

History data 220 may include user history information, such as user profile 123 creation date, game applications 101 previously accessed by a user, date and time of prior game sessions, duration of prior game sessions, etc. A game session generally includes a discrete user access of a game application 101, e.g., user access occurring in a period between logging in to a game application 101 on a server 105, 110, 115 and logging out of game application 101 on server 105, 110, 115. However, as described below, a game may also be saved and continued. For example, a game may be initially provided from game server 105, saved, and continued from game server 110. Of course, a game conducted through a game server 105 may also be continued at that same server 105. In any event, a game session generally includes one or more interactions between a user device 130, 135, 145, 150, 155, 165 and a game application 101.

State data 225 includes information relating to the state in which a game is stored. State data 225 includes parameters needed to recreate a state of a stored game as of a point when a game is stored. Game manager 120 may store state data as part of user profile 123, e.g., when game manager 120 receives a specific input from a user device 130, 135, 145, 150, 155, 165 to store such a game, or may store games automatically, such as upon each passage of a predetermined time interval, or upon termination of a game. State data 225 may include, by way of example only and not of limitation, information such as location of a user character within a game world, experience level and health of a user character, inventory of items possessed by the character, appearance of the character, location and appearance of other characters within the game, appearance of the game world, etc.

Profile status data 230 includes information relating to the status of a user profile 123. For instance, profile status data 230 may include a login status flag indicative of whether a user associated with a user identifier 205 is presently logged in to gaming system 100. User profile 123 may further include additional information regarding login status of a user profile 123, such as whether a user is presently associated with a game session. Login status flag may be updated when a server 105, 110, 115 is accessed by a user device 130, 135, 145, 150, 155, 165, to indicate that user profile 123 is currently in use. A user profile login status flag may subsequently be updated when a server connection with user device 130, 135, 145, 150, 155, 165 is ended, such as by logging off user device 130, 135, 145, 150, 155, 165. Such updates prevent a user profile 123 from being accessed by multiple user devices 130, 135, 145, 150, 155, 165 at the same time. Profile status data 230 may further include a service level associated with a user profile 123 and may provide an indication of privileges associated with user profile 123. For instance, an online service may offer a premium and a basic level service option, with the premium level service allowing for higher connection speeds, increased program options, etc.

Subscription data 235 includes information relating to a status of a user subscription. For instance, user profile 123 may include information regarding services purchased by a user, e.g. program options to which a user subscribes, games which a user has purchased, messaging services purchased, as well as relevant service dates, such as service expiry dates, and renewal and payment options, etc.

A number of different connection parameters 210 may be used in establishing a game session and may influence a level of service provided to device 130, 135, 145, 150, 155, 165, for example, the quality of a connection between a server 105, 110, 115, etc., and a user device 130, 135, 145, 150, 155, 165. Connection parameters 210 which influence quality of service, such as device type stored in device type 240, device ID stored in device ID 245, graphics support, e.g., resolution support, graphics processing capabilities, etc., stored in graphics support data 250, and connection speed stored in connection speed 255, etc., may be stored as part of user profile 123.

Device type 240 may include an identifier indicating a type of device 130, 135, 145, 150, 155, 165 accessing system 100, which may be provided to game manager 120, e.g. as part of a user input string received from a device 130, 135, 145, 150, 155, 165. Further, a device type may be provided automatically by client software on a device 130, 135, 145, 150, 155, 165. For instance, device type 240 may indicate that a user device 130, 135, 145, 150, 155, 165 accessing system 100 is a mobile phone 145, or a computer 130. Device type 240 may be associated with further information stored in user profile 123 and/or user profile database 122, regarding specific capabilities of user device 130, 135, 145, 150, 155, 165, such as processing power, memory, graphics support, etc. for a particular device type.

Device ID 245 may include information relating to one or more devices 130, 135, 145, 150, 155, 165 associated with a user profile 123. Information included in device ID 245 may include a mobile phone Electronic Serial Number (ESN) associated with a specific mobile phone 145 often used to access user profile 123, a network Media Access Control (MAC) address corresponding to a computer 130 frequently used to access user profile 123, etc. Device ID 245 may thus be used by game manager 120 to identify a user attempting to access a user profile 123, such as by searching database 122 for a stored ESN matching an ESN received from user device 130, 135, 145, 150, 155, 165. Information associated with specific user devices 135, 145, 155, 165, such as an ESN or MAC address may be received by a server 105, 110, 115 or game manager 120 upon initial connection by a user device 130, 135, 145, 150, 155, 165, and may be used to indicate to a server 105, 110, 115 or game manager 120 that a given user device 130, 135, 145, 150, 155, 165 is authorized to access server 105, 110, 115, without requiring user identifier 205 to be transmitted from user device 130, 135, 145, 150, 155, 165. Device ID 245 may include information relating to one or more devices 130, 135, 145, 150, 155, 165 associated with a user profile 123, such that a user profile 123 may have a plurality of devices 130, 135, 145, 150, 155, 165 associated therewith.

Graphics support 250 may include information relating to the ability of a device 130, 135, 145, 150, 155, 165 to process and display graphical data, such as an amount of memory available in a device cache, available display size and resolution, graphics processor speed, display contrast ratio, etc.

Connection speed 255 includes information relating to the speed at which a server 105, 110, 115 may communicate with a device 130, 135, 145, 150, 155, 165. Connection speed 255 may be affected by a server 105, 110, 115 through which game manager 120 is communicating with a user device 130, 135, 145, 150, 155, 165, and/or may be affected by communication abilities of device 130, 135, 145, 150, 155, 165, such as device processing speed, method of communication employed by device 130, 135, 145, 150, 155, 165, etc.

Connection parameters 210 may even govern determining a set of gaming content available to a given user device 130, 135, 145, 150, 155, 165, through a connection to a server 105, 110, 115. For example, some gaming content may require that a user device 130, 135, 145, 150, 155, 165, etc. support a minimum connection speed, a minimum graphics level, have a certain minimum amount of memory, etc. Therefore, game manager 120 may deny access to devices 130, 135, 145, 150, 155, 165 not meeting one or more of these minimum requirements.

Information in a user profile 123 stored in user profile database 122 may be accessed and edited through a user device 130, 135, 145, 150, 155, 165 authenticated to a server 105, 110, 115. For example, user identifier 205 stored in user profile 123 may be edited by a user, e.g., using a user device 130, 135, 145, 150, 155, 165. Game manager 120 may receive input from a user device 130, 135, 145, 150, 155, 165 through network 125 and/or 127. Database 122 may also be accessed by a system administrator, e.g., to create, edit or delete user profiles 123.

Figure 3:
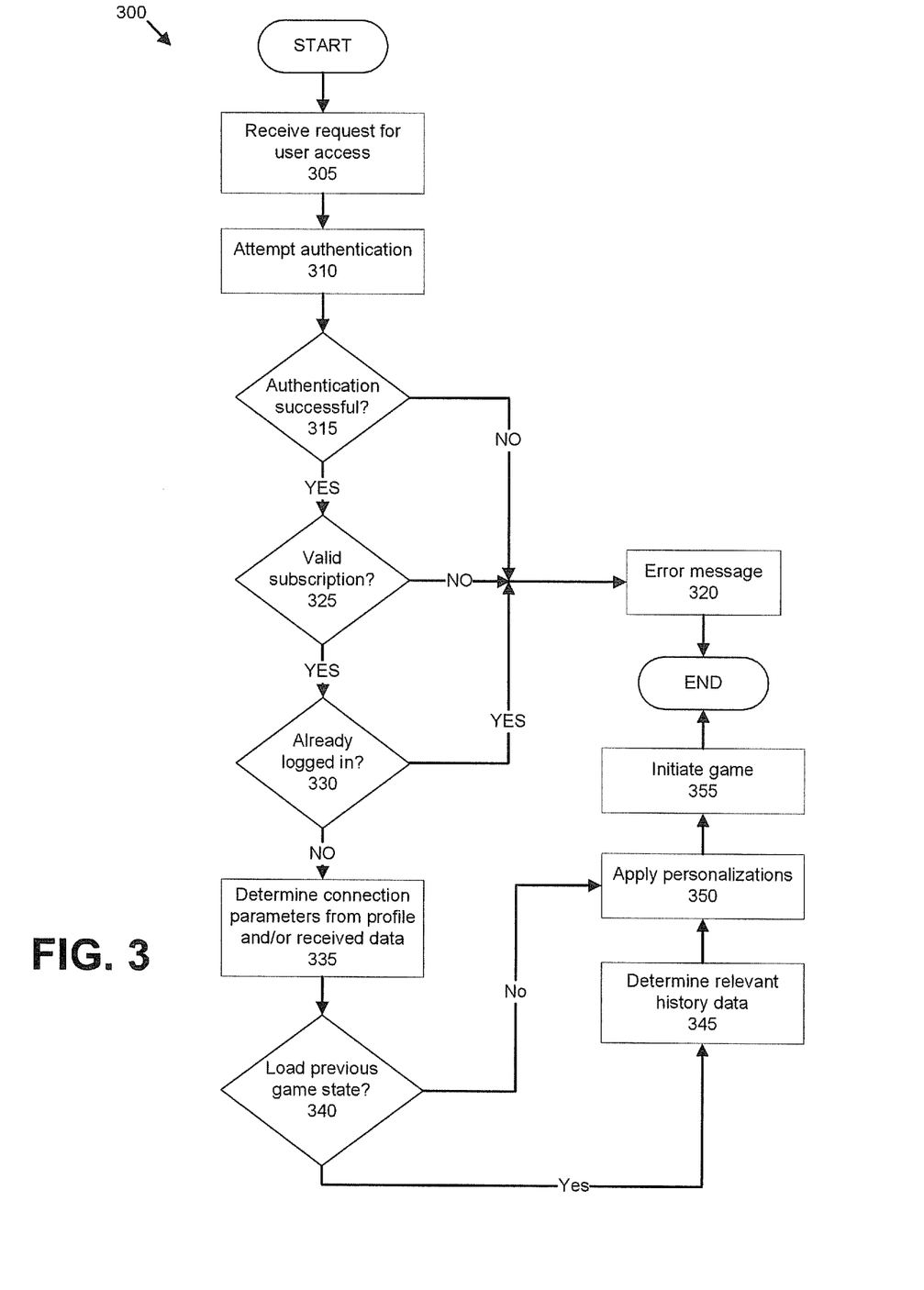
FIG. 3 illustrates an exemplary process for initiating a game.

FIG. 3 illustrates an exemplary process 300 for initiating a game session.

At step 305, game manager 120 receives a request for user access to a game application 101. Such a request may be initiated by a user device 130, 135, 145, 150, 155, 165, and may be sent directly to game manager 120 through network 125 and/or 127. Alternatively, such a request may be sent to game manager 120 from a user device 130, 135, 145, 150, 155, 165, e.g., through a server 105, 110, 115. Such a request may be submitted in a known manner, e.g. via HTTP as parameters included in a Uniform Resource Locator (URL) string, etc.

Next, at step 310, game manager 120 attempts to authenticate a device 130, 135, 145, 150, 155, 165, such as by querying user profiles 123 stored in user profile database 122 for a user identifier 205 that matches at least a portion of an input string received from a device 130, 135, 145, 150, 155, 165 as part of a user access request received in step 305. A received input string may include a user ID and password, or may include information provided automatically, e.g., according to program instructions included within a user device 130, 135, 145, 150, 155, 165, such information including, for example, a mobile phone ESN, a MAC address, etc.

Next, at step 315, game manager 120 determines whether an authentication attempted as described in step 310 has been successful. Successful authentication generally results from a match of a received user input with a user identifier 205 included in a user profile 123 stored in user profile database 122. If authentication was successful, step 325 is executed next. Otherwise, step 320 is executed next.

At step 320, which may follow any of steps 315, 325, or 330, game manager 120 generates an error message if authentication attempted as described in step 310 was not successful, such as if a received user input does not match a user identifier 205 included in a user profile 123. Additionally, game manager 120 may generate error messages in response to other situations, such as those described below, including when a game manager 120 determines that a user does not have a valid subscription at step 325, or when a game manager 120 determines that a user is already logged in at step 330. Such error messages may include e.g. a timestamp, a received input string, etc. Error messages generated as described in step 320 may be written to a log file and/or provided to a user device 130, 135, 145, 150, 155, 165 for display.

After an error message is generated as described in step 320, process 300 ends.

At step 325, which follows step 315 in the event that game manager 120 has determined that an authentication was successful as described in step 315, game manager 120 determines whether a user requesting access has a valid subscription, such as by querying subscription data 235. If a user does not have a valid subscription, step 320 is executed next. If a user has a valid subscription, step 330 is executed next.

At step 330, which follows step 325, game manager 120 determines whether the user requesting access is already logged in to a server 105, 110, 115 on system 100, such as by querying a login status flag in profile status data 230 of user profile 123. If a login status flag in profile status data 230 indicates that the user is already logged in, step 320 is executed next. Otherwise, step 305 is executed next. In addition to, or as an alternative to, the error message generated at step 320, if the login status flag in profile status data 230 indicates the user is already logged in, game manager 120 may be configured to e.g. automatically terminate a prior session and allow the present login attempt or to provide the user with the option of terminating the previous login. Although not shown in FIG. 3, if the prior login session is terminated by the user, step 335 may be executed next.

At step 335, when game manager 120 has determined in step 330 that the login status of a user who requested access in step 305 indicates the user is not currently logged in to a server 105, 110, 115, game manager 120 determines connection parameters of the device 130, 135, 145, 150, 155, 165 through which access is requested. Connection parameters may be determined, e.g., by retrieving connection parameters 210 stored as part of user profile 123, or from an input string received by game manager 120 during the request for user access in step 305. Connection parameters 210 includes information such as device type 240, information contained in device ID 245, device graphics support data stored in graphics support 250, connection speed 255, etc.

Next, at step 340, game manager 120 determines whether the request for user access is a request for a new game of a requested game application 101, or a request for a continuation of a previous game. Game manager 120 may make such a determination by querying state data 225 stored as part of a user identifier 123 in user profile database 122, or by querying a user input configured to select a new game or a saved game. If a request for user access is a request for a new game of a requested game application 101, step 350 is executed next. If a request for user access is a request for a continuation of a previous game, step 345 is executed next.

At step 345, if game manager 120 determined in step 340 that a user access request is a request for a continuation of a previous game, game manager 120 will retrieve relevant state data 225 stored in user profile 123. Relevant state data may include, by way of example and not limitation, a stored game previously stored by a user, user preferences relating to a particular game application 101, character life level, power and inventory, character location within the game, etc.

At step 350, which may follow either of steps 340 or 345, game manager 120 retrieves personalization data 215 associated with user profile 123. As mentioned above, personalization data 215 may include e.g. a user name to be used in a game, an avatar to be used as a graphical representation of a user during games, etc.

Next, at step 355 a game is established by game manager 120. Establishing of a game may include instantiation of game application 101, or a module within game application 101, that provides media stream 190, and may further include selecting a particular game server 105, 110, 115, etc.

Process 300 ends following step 355.

Figure 4:
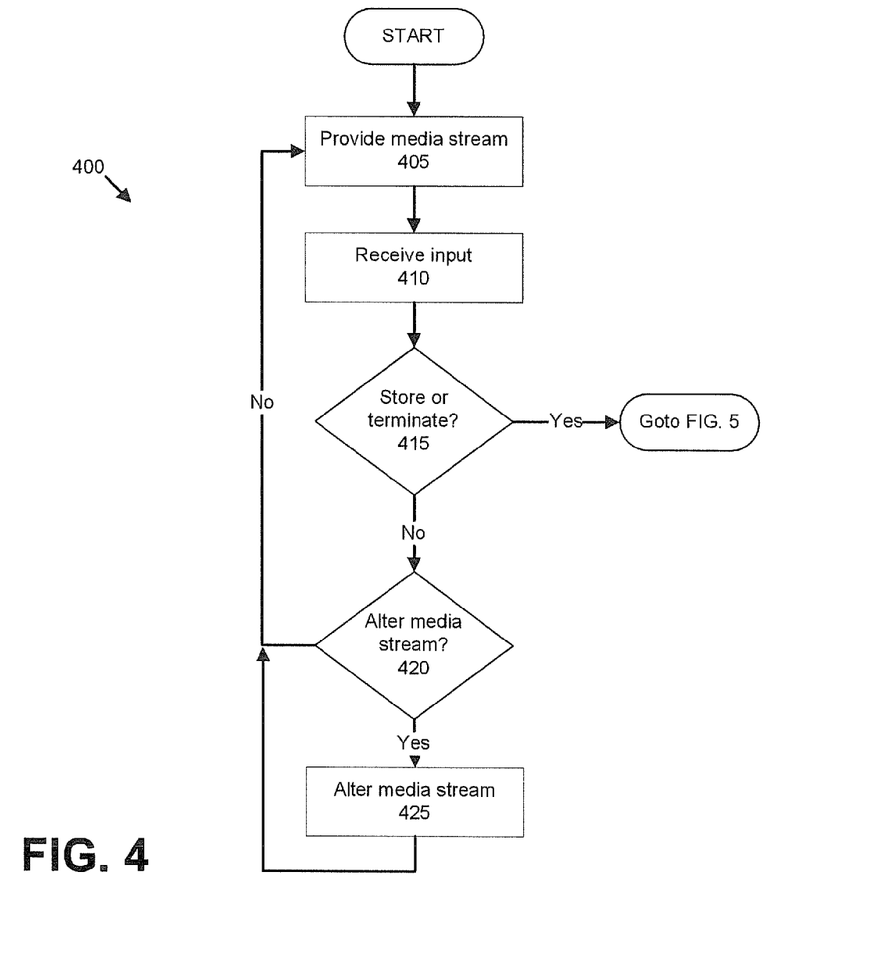
FIG. 4 illustrates an exemplary process for conducting a game.

FIG. 4 illustrates an exemplary process 400 for conducting a game session, after game manager 120 has established a game session, e.g., as illustrated in process 300.

At step 405, game application 101, e.g., from a server 105, 110, 115, provides a media stream 190 to a user device 130, 135, 145, 150, 155, 165, e.g. over LAN 125 through packet network 127. Additionally or alternatively, game application 101 may provide media stream 190 to a device 130, 135, 145, 150, 155, 165 through a media server 185 located at a VHO 180. Parameters of media stream 190 are determined in part by connection parameters 210. For example, various devices 130, 135, 145, 150, 155, 165 may accommodate different sized graphical displays and/or different resolutions of graphical images. Media stream 190 is formatted according to connection parameters 210 for a particular device 130, 135, 145, 150, 155, 165.

Next, at step 410, game application 101 receives a user input from a user device 130, 135, 145, 150, 155, 165.

At step 415, game application 101 determines whether the input received in step 410 includes a request to store game progress or to terminate game application 101. If game application 101 determines that the input received in step 410 does not include such a request, then step 420 is executed next. If game application 101 determines that the input received in step 410 does include a request to store game progress or to terminate game application 101, then process 400 ends and process 500, illustrated in FIG. 5, commences.

At step 420, game application 101 determines whether the input received in step 410 requires an alteration of media stream 190 provided to user device 130, 135, 145, 150, 155, 165. For example, a user may provide input to move a character or item in a game, or to otherwise alter a representation of a game provided by game application 101. If the input received in step 410 does not require altering media stream 190, step 405 is executed next. If the input received in step 410 does require alteration of media stream 190, step 425 is executed next.

At step 425, game application 101, according to the input received in step 410, alters media stream 190, thereby allowing a user to interact with the game provided by game application 101. Following step 425, step 405 is executed.

Figure 5:
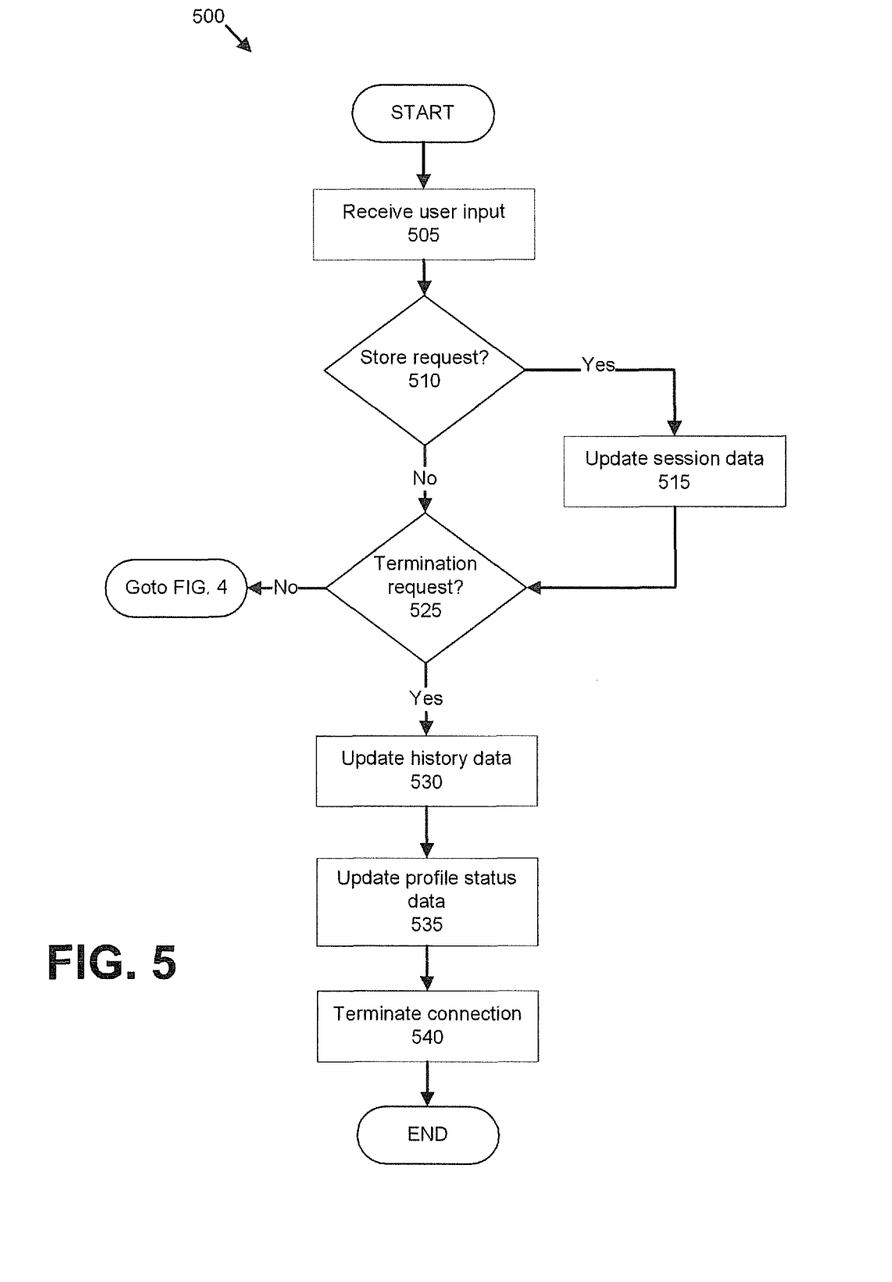
FIG. 5 illustrates an exemplary process for terminating or pausing a game.

FIG. 5 illustrates an exemplary process for storing game progress, or terminating a game application 101, after a game session has been initiated, e.g., as described above with reference to either of processes 300 or 400.

At step 505, game application 101 receives an input from a user device 130, 135, 145, 150, 155, 165.

Next, at step 510, game application 101 determines whether the input received in step 505 includes a request to store a game state. If the input received in step 505 includes a request to store a game state, step 515 is performed next. If the input received in step 505 does not include a request to store a game state, step 525 is executed next.

At step 515, when game application 101 has determined that the input received in step 505 includes a request to store a game, game manager 120 retrieves relevant state data from game application 101 and stores relevant state data to state data 225 in user profile 123. Game manager 120 retrieves relevant state data by querying game application 101 and/or server 105, 110, 115.

At step 525, which may follow either of steps 510 or 515, game application 101 determines whether the input received in step 505 includes a request to terminate a game session. If the input received in step 505 includes a request to terminate a game session, step 530 is performed next. If the input received in step 505 does not include a request to terminate a game session, then process 500 ends and step 420 of process 400, illustrated in FIG. 4, is executed next.

At step 530, when game application 101 has determined that the input received in step 505 includes a request to terminate a game session, game manager 120 updates history data 220 to store, e.g., a time at which the game session is terminated.

Next, at step 535, game manager 120 updates a login status flag associated with profile status data 230 in user identifier 123, to indicate a user connection to server 105, 110, 115 is being terminated.

At step 540, game manager 120 terminates the connection to device 130, 135, 145, 150, 155, 165. Process 500 ends after step 540.

Figure 6:
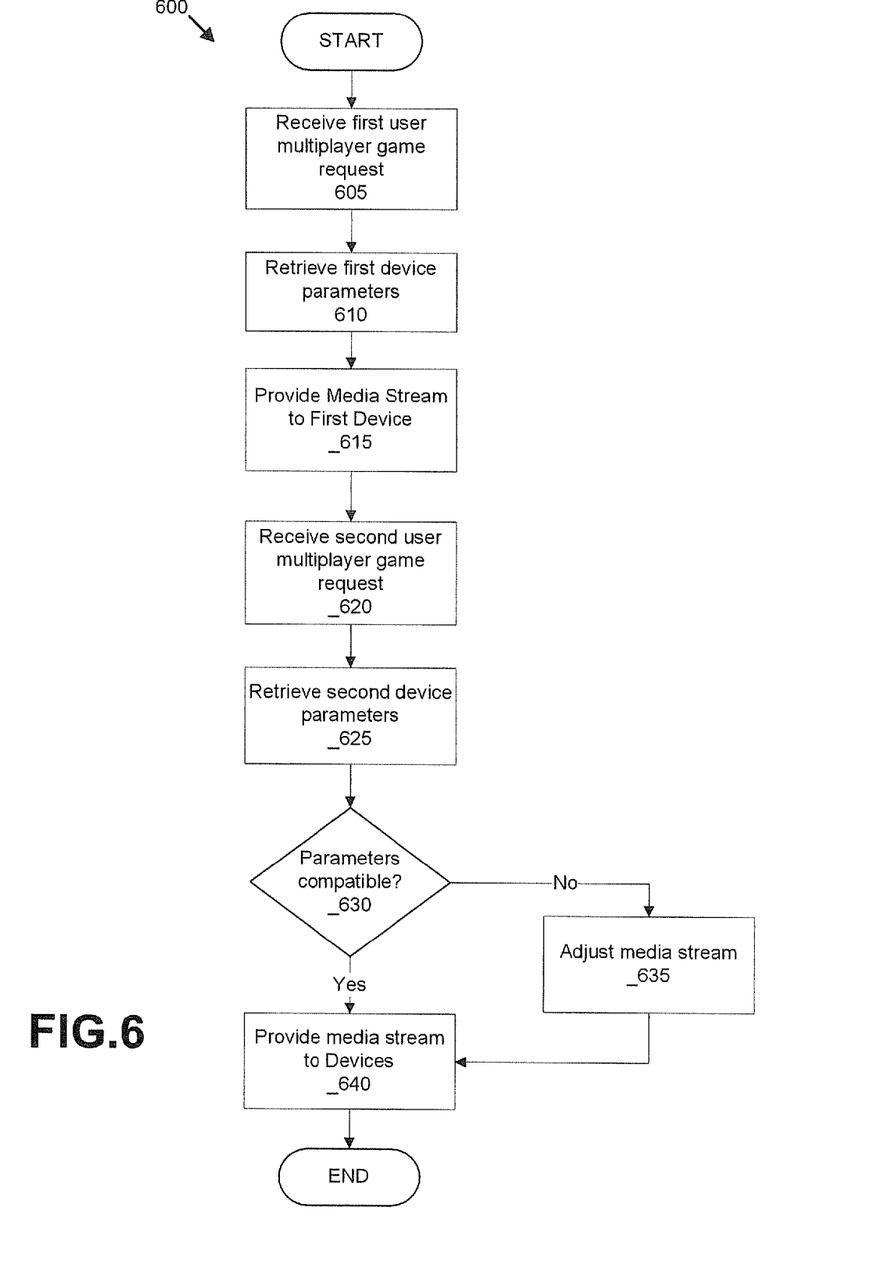
FIG. 6 illustrates an exemplary process for providing multi-player gaming.

FIG. 6 illustrates an exemplary process 600 for initiating a multi-player game between at least a first user and a second user, the users having been granted system 100 access, e.g., as described in process 300.

At step 605, game manager 120 receives a request to start a multiplayer game from a first user of a first device 130, 135, 145, 150, 155, 165.

Next, at step 610, game manager 120 retrieves relevant parameters regarding the first user device 130, 135, 145, 150, 155, 165, e.g., from user profile 123 associated with the first user. Such relevant parameters include, e.g., connection parameters 210, such as device type 240, graphics support 250, connection speed 255, subscription data 235, etc. Such relevant parameters may further be retrieved from an input string provided as part of a user access request or otherwise provided by a game client of a device 130, 135, 145, 150, 155, 165, such as a request for user access of step 305 in FIG. 3.

Next, at step 615, media stream 190 is presented to first user device 130, 135, 145, 150, 155, 165, according to the parameters determined as described in step 610.

Next, at step 620, game manager 120 receives a request to join a multiplayer game from a second user of a second device 130, 135, 145, 150, 155, 165.

At step 625, in similar fashion as that described for step 610, game manager 120 retrieves relevant parameters regarding the second user device 130, 135, 145, 150, 155, 165, e.g., from a user profile 123 associated with the second user. Such relevant parameters include, e.g., connection parameters 210, such as device type 240, graphics support 250, connection speed 255, subscription data 235, etc. Such relevant parameters may further be retrieved from an input string provided as part of a user access request or otherwise provided by a game client on a device 130, 135, 145, 150, 155, 165, such as a request for user access of step 305 in FIG. 3.

At step 630, after game manager 120 has retrieved relevant information for second user device 130, 135, 145, 150, 155, 165, game manager 120 determines whether first user device 130, 135, 145, 150, 155, 165 parameters are compatible with second user device 130, 135, 145, 150, 155, 165 parameters. That is, game manager 120 determines whether second device 130, 135, 145, 150, 155, 165 could be provided a media stream 190 according to connection parameters 210 for first device 130, 135, 145, 150, 155, 165. Such connection parameters 210 for devices 130, 135, 145, 150, 155, 165 may not match exactly, but game manager 120 may be programmed to determine compatibility according to a range of values, e.g., an 1152-pixel high screen may be compatible with a 1280-pixel high screen, but not a 375-pixel high screen. If the parameters are compatible, step 640 is executed next. If the parameters are not compatible, step 635 is executed next.

At step 635, game manager 120 adjusts media stream 190 for the first and/or second device 130, 135, 145, 150, 155, 165. If game manager 120 has determined that the parameters of the first user device 130, 135, 145, 150, 155, 165 are not the same as the parameters of second user device 130, 135, 145, 150, 155, 165, game manager 120 instructs server 105, 110, 115 to adjust media stream 190 provided to the first and/or second device 130, 135, 145, 150, 155, 165. For example, if first user device 130, 135, 145, 150, 155, 165 is able to receive a media stream 190 at a faster data rate than second user device 130, 135, 145, 150, 155, 165, game manager 120 will reduce the data rate at which media stream 190 is provided to first device 130, 135, 145, 150, 155, 165. To take another example, if first user device 130, 135, 145, 150, 155, 165 is able to present graphics at a resolution that is less than a resolution at which second user device 130, 135, 145, 150, 155, 165 displays graphics, media stream 190 sent to second user device 130, 135, 145, 150, 155, 165 will be sent according to a resolution compatible with a maximum graphics level supported by first device 130, 135, 145, 150, 155, 165. Further, game manager 120 may adjust media stream 190 for both a first and second device 130, 135, 145, 150, 155, 165, e.g., by setting a common graphics resolution for both, setting a common data rate for both, etc.

At step 640, media stream 190 is presented to first user device 130, 135, 145, 150, 155, 165 and second user device 130, 135, 145, 150, 155, 165. If it was determined in step 630 that first user device 130, 135, 145, 150, 155, 165 and second user device 130, 135, 145, 150, 155, 165 have compatible parameter values, media stream 190 is provided to both the first and second user device 130, 135, 145, 150, 155, 165 as it would be provided to a first user device 130, 135, 145, 150, 155, 165 in a single player game. If it was determined in step 630 that the first and second user device 130, 135, 145, 150, 155, 165 have parameters that are not compatible, media stream 190 will be provided to first user device 130, 135, 145, 150, 155, 165, and second user device 130, 135, 145, 150, 155, 165 according to a modified quality service, in the manner described in step 635.

Process 600 ends after step 640.

CONCLUSION

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system comprising:
a first game server configured to provide a multi-player game to a first user device associated with a first category of user device;
a second game server configured to provide the multi-player game to a second user device associated with a second category of user device, wherein the first category of user device is different from the second category of user device, and wherein the first and second category of user device are each selected from the group consisting of personal computers, cellular telephones, set top boxes, and handheld computers; and
a game manager configured to receive a request for the multi-player game from each of the first and second user devices and to assign the request from the first user device to the first game server and the request from the second user device to the second game server, and wherein the first game server selectively provides, according to a first set of connection parameters associated with the first category of user device, a media stream of the multi-player game to the first user device while the second game server selectively provides, according to a second set of connection parameters associated with the second category of user device, a media stream of the game to the second user device to initiate the multi-player game between a user of the first user device and a user of the second user device based at least in part on the first and second sets of connection parameters and the first and second categories of user devices.

2. The system of claim 1, further comprising a user profile database in selective communication with the first game server, the second game server, and the game manager, the first game server and the second game server being configured to provide the media streams at least in part according to information retrieved from the user profile database.

3. The system of claim 1, the game manager being further configured to receive the request from at least one of the first and second user devices via one of the first game server and the second game server.

4. The system of claim 1, wherein the first game server and the second game server are each one of a broadband game server, a wireless game server, and a television game server.

5. The system of claim 1, further comprising a media server in a video hub office, the media server being configured to receive a media stream from at least one of the first game server and the second game server and to provide the media stream to at least one of the first and second user devices within a customer premises.

6. The system of claim 1, wherein the first set of connection parameters and the second set of connection parameters include at least one of: connection speed, processor speed, graphics resolution, amount of device cache, and device type.

7. The system of claim 1, wherein the game manager is configured to determine whether parameters associated with the first user device are compatible with parameters associated with the second user device.

8. The system of claim 7, wherein the game manager is configured to adjust the media stream provided to the first user device and the second user device if the parameters associated with the first user device are incompatible with the parameters of the second user device.

9. A method comprising:
receiving a request from a first user device for a multi-player game;
receiving a request from a second user device for the multi-player game;
making determinations regarding whether the first user device is included in a first category of user device and whether the second user device is included in a second category of user device, wherein the first category of user device is different from the second category of user device, and wherein the first and the second category of user device are each selected from the group consisting of personal computers, cellular telephones, set top boxes, and handheld computers;
assigning the request to one of a first game server and a second game server according to the determinations; and
selectively providing a media stream of the multi-player game to the first user device from the first game server according to a first set of connection parameters and to the second user device from the second game server according to a second set of connection parameters to initiate the multi-player game between users of the first and second user devices based at least in part on the first and second sets of connection parameters and the first and second categories of user devices.

10. The method of claim 9, further comprising:
retrieving information from a user profile database; and
providing the media stream of the game to the first or second user device from one of the first game server and the second game server at least in part according to the information.

11. The method of claim 9, wherein the first game server and the second game server are each one of a broadband game server, a wireless game server, and a television game server.

12. The method of claim 9, wherein the first game server, the second game server, and the game manager are included within a single computing device.

13. The method of claim 9, wherein the first set of connection parameters and the second set of connection parameters include at least one of: connection speed, processor speed, graphics resolution, amount of device cache, and device type.

14. The method of claim 9, embodied as computer-executable instructions included on a non-transitory computer-readable medium.

15. The method of claim 9, further comprising determining whether the first set of connection parameters is compatible with the second set of connection parameters.

16. The method of claim 9, further comprising adjusting the media stream provided to the first user device based on the second set of connection parameters if the first set of connection parameters is incompatible with the second set of connection parameters.

17. The method of claim 9, wherein the first game server is a television game server.

18. The method of claim 9, wherein the first set of connection parameters and the second set of connection parameters include an amount of device cache and at least one of: connection speed, processor speed, graphics resolution, and device type.

19. A method, comprising:
receiving a first request from a first user device for a multi-player game;
making a determination that the first user device is included in a first category of user device;
assigning the first request to a first game server according to the determination;
receiving a second request from a second user device for the multi-player game;
making a determination that the second user device is included in a second category of user device, wherein the first category of user device is different from the second category of user device, and wherein the first and second category of user device are each selected from the group consisting of personal computers, cellular telephones, set top boxes, and handheld computers;
assigning the second request to a second game server according to the determination;
selectively providing, from the first game server, a media stream of the game to the first user device according to a first set of connection parameters;
selectively providing, from the second game server, the media stream of the game to the second user device according to a second set of connection parameters;
determining whether parameters associated with the first user device are compatible with parameters associated with the second user device; and adjusting a media stream provided to at least one of the first and second user devices if the parameters are incompatible.

20. The method of claim 19, embodied as computer-executable instructions included on a non-transitory computer-readable medium.

21. A method of claim 19, wherein the first request is a request to store game state data, and the second request is to initiate the game with the stored game state data.

22. A system comprising:
a first game server configured to provide a multi-player game to a first user device associated with a first category of user device;
a second game server configured to provide the multi-player game to a second user device associated with a second category of user device; and
a game manager configured to receive a request for the multi-player game from each of the first and second user devices and to assign the request from the first user device to the first game server and the request from the second user device to the second game server, and
wherein the first game server selectively provides, according to a first set of connection parameters associated with the first category of user device, a media stream of the multi-player game to the first user device while the second game server selectively provides, according to a second set of connection parameters associated with the second category of user device, a media stream of the game to the second user device to initiate the multi-player game between a user of the first user device and a user of the second user device based at least in part on the first and second sets of connection parameters and the first and second categories of user devices, and
wherein the first category of user devices is set top boxes, and the second category of user devices is devices other than set top boxes, and further wherein the first and second game server are one of a broadband game server, a wireless game server and a television game server.

23. A method comprising:
receiving a request from a first user device for a multi-player game;
receiving a request from a second user device for the multi-player game;
making a determination regarding whether the first and second user devices are included in a first category of user device or a second category of user device;
assigning the request to one of a first game server and a second game server according to the determination; and
selectively providing a media stream of the multi-player game to the first user device from the first game server according to a first set of connection parameters and to the second user device from the second game server according to a second set of connection parameters to initiate the multi-player game between users of the first and second user devices based at least in part on the first and second sets of connection parameters and the first and second categories of user devices,
wherein the first category of user devices is set top boxes and the second category of user devices is devices other than set top boxes, and further wherein the first and second game server are one of a broadband game server, a wireless game server and a television game server.

* * * * *